United States Patent [19]

Ksovreli et al.

[11] Patent Number: 4,885,487
[45] Date of Patent: Dec. 5, 1989

[54] ELECTROMAGNETIC OSCILLATION MOTOR

[75] Inventors: Robinzon I. Ksovreli; Alexandr K. Didebulidze, both of Tbilisi; Valery K. Kochiev; Amiran F. Gasseev, both of Tskhinvali, all of U.S.S.R.

[73] Assignee: Gruzinsky Selskokhozyaistvenny Institut, Tbilisi-Digomi, U.S.S.R.

[21] Appl. No.: 236,528
[22] PCT Filed: Sep. 16, 1986
[86] PCT No.: PCT/SU86/00088
§ 371 Date: May 11, 1988
§ 102(e) Date: May 11, 1988
[87] PCT Pub. No.: WO88/02193
PCT Pub. Date: Mar. 24, 1988
[51] Int. Cl.⁴ .............................................. H02K 33/00
[52] U.S. Cl. ...................... 310/36; 310/207; 318/119; 318/556
[58] Field of Search .................. 310/36, 37, 38, 39, 310/15, 202, 207; 318/37, 122, 124, 556, 119

[56] References Cited

U.S. PATENT DOCUMENTS

| | | | |
|---|---|---|---|
| 1,814,945 | 7/1931 | McCracken | 318/122 |
| 3,343,012 | 9/1967 | Scott | 318/124 |
| 3,538,358 | 11/1970 | Bauerle . | |
| 3,959,673 | 5/1976 | Montagu . | |
| 4,626,717 | 12/1986 | Hensing | 310/36 |

FOREIGN PATENT DOCUMENTS

| | | | |
|---|---|---|---|
| 2449697 | 4/1975 | Fed. Rep. of Germany | 310/37 |
| 1552754 | 1/1969 | France . | |
| 194630 | 6/1967 | U.S.S.R. . | |
| 1040573 | 5/1986 | U.S.S.R. . | |

*Primary Examiner*—R. Skudy
*Attorney, Agent, or Firm*—Lilling & Greenspan

[57] ABSTRACT

An electromagnetic oscillation motor has an asymmetrical four-pole stator with an a.c. winding including two paths connected in parallel. Each path includes two serially connected coils received on the adjacent poles of the stator. The poles of the stator forming one pair are offset in opposite directions away from each other, while the poles forming the other pair are offset toward each other relative to the symmetry axes of their corresponding poles of the armature, through a distance equalling one half of the angular width of the stator winding. The oscillation motor further comprises a four-pole symmetrical armature, its poles being provided with a d.c. winding. The coils of this winding are connected in pairs in the matched-series fashion, while the pairs themselves are interconnected in opposition.

1 Claim, 1 Drawing Sheet

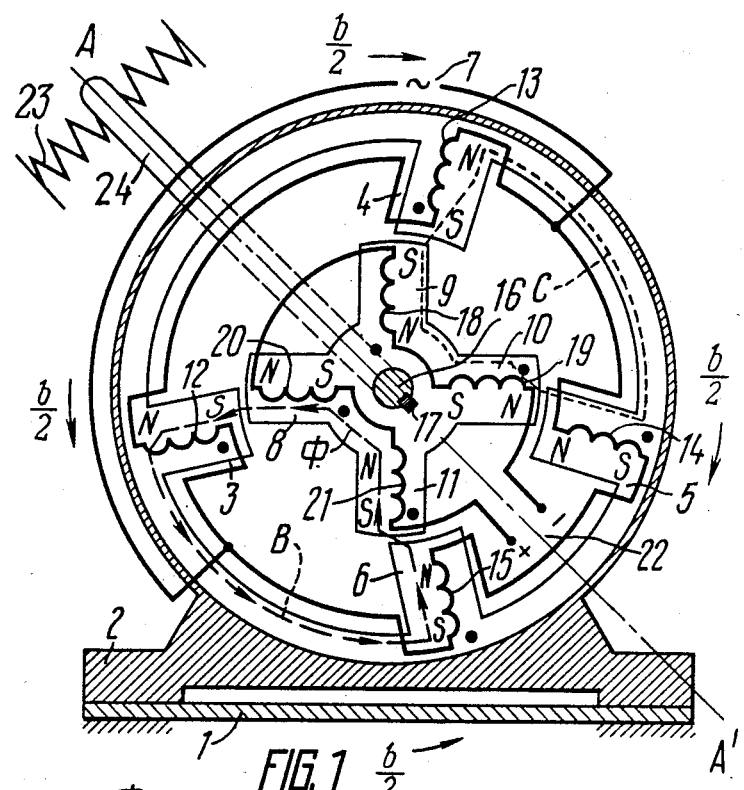
FIG. 1
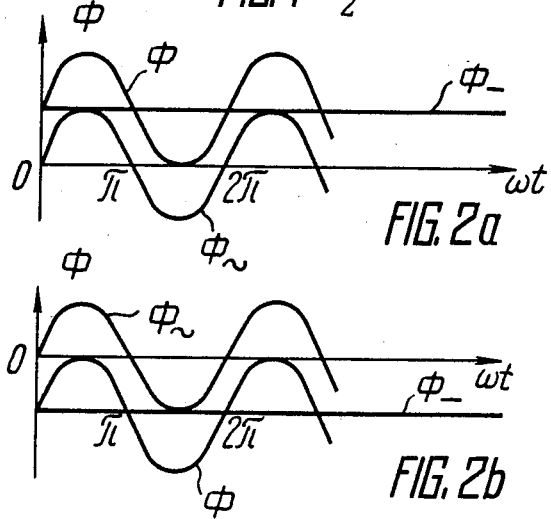
FIG. 2a
FIG. 2b

ELECTROMAGNETIC OSCILLATION MOTOR

BACKGROUND OF THE INVENTION

1. Field of the Invention

The invention relates to special-purpose electric motors used for driving various work-performing members through angular oscillations, and more particularly it relates to electromagnetic oscillation motors.

2. Description of the Prior Art

There is known an electromagnetic oscillation motor (see SU Inventor's Certificate No. 1,040,573; Int. Cl.$^3$ HO2K 33/14, dated 1983) having a stator with a winding received on two pairs of poles symmetrically arranged in a circle, the parallel paths of this winding being connected to a voltage source through respective rectifiers connected in opposition to each other, and a salient asymmetrically armature whose poles are offset in pairs in opposite directions relative to the symmetry axis by one half of their angular width.

In this known motor, the incorporation of the rectifiers has been found to affect the power characteristics of the motor, while the asymmetry of its armature, the small spacing of the adjacent poles in particular, has been found to incur manufacturing difficulties in application of the bias winding onto the armature, and to impair the cooling conditions. Furthermore, in motors of higher power ratings the asymmetry of the armature adversely affects the dynamic characteristics of the motor.

There is also known an electromagnetic oscillation motor (see FR Pat. No. 1,552,754; Int. Cl. HO2K, published on Jan. 1, 1969) comprising a four-pole symmetrical armature and an asymmetrical four-pole stator whose poles are offset in the same direction through one half of the angular width of the poles. The a.c. winding of the stator includes two paths connected in parallel and received on the opposite poles of the stator. Each path has two serially connected coils and is connected to a power supply source through a semiconductor diode. During odd half-cycles, the alternating current of the power supply source is directed through one parallel path of the stator winding, and during even half-cycles it is directed through another path. Consequently, corresponding magnetic fluxes are excited by the two paths of the magnetic circuit, generating sign-variable driving torque resulting in oscillations of the armature in accordance with the harmonic law.

However, the incorporation of the half-wave rectifiers in this known structure of an electromagnetic oscillation motor impairs its power characteristics and distorts the current curve, thus adversely affecting the power supply source. Moreover, this structure prohibits full compensation for the electromotive force of self-induction by using bias circuits, on account of the parallel paths of the stator winding being arranged on the opposite poles, which involves intersection of the magnetic fluxes developing the driving effort. The extended length of the magnetic circuit further impairs the power characteristics of the oscillator motor.

SUMMARY OF THE INVENTION

It is an object of the present invention to create an electromagnetic oscillation motor wherein the structural design of the stator and the arrangement of the winding coils should enhance the efficiency factor and the power factor, and should also provide for controlling the amplitude of oscillations of the armature by varying the bias current.

This is achieved in that an electromagnetic oscillation motor comprising a symmetrical four-pole armature with a d.c. winding and an asymmetrical four-pole stator with an a.c. winding made of two paths connected in parallel, each path including two serially connected coils. In accordance with the present invention, the adjacent poles of the stator, forming one pair, are offset in opposite directions away from each other, while the adjacent poles forming the other pair are offset toward each other relative to the respective symmetry axes of their corresponding poles of the armature through an extent corresponding to one half of the angular width of the poles of the stator, each respective path of the a.c. winding being received on its corresponding pair of the adjacent poles of the stator, and the d.c. winding coils of the armature being connected in pairs in matched series and received on the adjacent poles of the armature, these pairs of coils being connected in opposition.

The invention provides for enhancing the reliability of an electromagnetic oscillation motor and for bringing down its manufacturing cost.

BRIEF DESCRIPTION OF DRAWINGS

The invention will be further described in connection with appended drawings illustrating an embodiment of the present invention, wherein:

FIG. 1 schematically illustrates an electromagnetic oscillation motor constructed in accordance with the invention; and FIGS. 2a and 2b present the curves of variation in time of magnetic fluxes crossing the annular air gap of the electromagnetic oscillation motor embodying the invention.

DESCRIPTION OF A PREFERRED EMBODIMENT

In the drawings, the electromagnetic oscillation motor has a baseplate 1 (FIG. 1) supporting on feet 2 a salient-pole stator which is asymmetrical circularly and mirror-symmetrical with respect to the symmetry axis A-A', the stator having poles 3, 4, 5 and 6 supporting thereon a d.c. winding connected to an a.c. power supply source 7. The adjacent poles 3 and 4 of the stator, forming one pair, are offset in opposite directions from one another with respect to the axes of symmetry of the respective poles 8 and 9 of the armature of the motor through a distance b/2 equally one half of the angular width "b" of the stator poles 3 and 4. The adjacent poles 5 and 6 of the stator, forming the other pair, are offset toward each other relative to the axes of symmetry of their corresponding poles 10 and 11 of the armature likewise throught the distance b/2.

The a.c. winding includes two paths connected in parallel. One path is a series connection of two coils 12 and 13 received on the poles 3 and 4 which are spaced in excess of the mean inter-pole spacing $\pi$ equalling $$\frac{2\pi R}{4}$$

where R is the radius of the bore in the stator. The other path is a series connection of two coils 14 and 15 received on the slator poles 5 and 6 which are spaced, as it has bean already explained, by a distance short of the mean inter-pole spacing $\pi$.

Mounted inside the stator on a rotatable shaft 16 with the aid of a key 17 is a symmetrical four-pole armature with its d.c. winding. The coils 18 and 19, 20 and 21 of the d.c. winding are connected in pairs in matched series and received, respectively, on the adjacent poles 9, 10 and 8, 11, the pairs being interconnected in opposition to each other. The stator and armature are mechanically interconnected with the aid of antifriction bearings (not shown in the drawing), and also through resilient elements 23 operatively connected with an arm 24 fast on the shaft 16. Depending on the required amplitude of oscillations, a work-performing member may be secured either on the shaft 16 of the oscillation motor or on the arm 24.

The following symbols are used in the drawing. FIG. 1: the total magnetic flux $\phi$ in the paths B and C of the magnetic circuit; N and S—the respective polarities of the poles 3, 4, 5, 6 of the stator and of the poles 8, 9, 10 and 11 of the armature.

FIG. 2 illustrates the time curves of variation of the magnetic fluxes $\phi$, 100 $\sim$, $\phi_-$ in the annular air gap of the oscillation motor, where $\phi_\sim$ is the magnetic flux developed by the winding of the stator, $\phi_-$ is the magnetic flux developed by the winding of the armature, $\phi$ is the total magnetic flux, t is time, and $\omega$ is the conditional rotational speed of the magnetic flux.

The herein disclosed electromagnetic oscillation motor operates, as follows.

In the situation shown in FIG. 2a, during the half-cycle from 0 to $\pi$ of the alternating current flowing through the stator winding, the alternating magnetic flux $\phi_\sim$ in the path B (FIG. 1) of the magnetic circuit is added to the permanent magnetic flux $\phi_-$ (FIG. 2a) developed by the d.c. winding of the armature, the resultant magnetic flux $\phi$ being conditionally positive. With the total magnetic flux $\phi$ in the path B (FIG. 1) of the magnetic circuit being at its maximum, the flux $\phi$ (FIG. 2b) in the path C (FIG. 1) practically equals zero. During the successive half-cycle from $\pi$ to $2\pi$ of the alternating current flowing through the stator winding the process is reversed: the total flux $\phi$ (FIG. 2b) in the path C (FIG. 1) is at the maximum, whereas the flux in the path B practically equals zero. Consequently, there is created a sign-variable driving torque causing angular oscillations of the armature according to the harmonic law, one of the preconditions of the development of this driving effort in the operation of the oscillation motor being the asymmetrical arrangement of the poles 8, 9, 10 and 11 of the stator relative to the symmetry axes of the corresponding poles 8, 9, 10 and 11 of the armature, with an angular shift through one half b/2 of the angular width "b" of the pole 3, 4, 5 or 6.

The herein disclosed electromagnetic oscillation motor offers an enhanced efficiency factor, owing to the stator winding being directly connected to the source 7 of alternating current, and also to the fact that all the poles 3, 4, 5, 6 of the stator and all the poles 8, 9, 10 and 11 of the armature take part all the time in the development of the electromagnetic effort. The incorporation of the d.c. winding for biasing the armature provides for compensating for the reactive power, and thus for stepping up the power factor (cos $\psi$).

By controlling the bias current of the armature, it is possible to vary the amplitude of the angular oscillations. With the coils 18 and 19, 20 and 21 of the armature winding being connected in pairs, counting from the power source 22, in a matched-series fashion, and with the pairs being interconnected in opposition, the electromotive force developed at the terminals of the armature winding equals zero.

With no semiconductor rectifiers included in its structure, the manufacturing cost of the herein disclosed oscillation motor is much lower, whereas its reliability characteristics are much batter.

The invention can be employed in various devices where the work-performing member is driven through repeated angular reciprocations or oscillations, widely used in various trades and industries, e.g. in general engineering for oscillation grinding, in agriculture for actuating oscillating screens and oscillating conveyers, in artificial blood circulation systems in medicine.

We claim:

1. An electromagnetic oscillation motor comprising a symmetrical four-pole armature with a DC winding and an asymmetrical four-pole stator with an AC winding made up of two parallel-connected paths, each said path including two series-connected coils (12, 13 and 14, 15), characterized in that the adjacent stator poles (3, 4) forming one pair are offset in opposite directions, while adjacent poles (5, 6) forming another pair are offset toward each other with respect to the axes of symmetry of respective poles (8, 9 and 10, 11) of the armature to a distance (b/2) equal to one half of the width (b) of stator poles, each path of the AC winding being received on the respective pair of adjacent stator poles (3, 4 and 4, 6), and, the coils (18, 19 and 20, 21) of the DC winding are connected in pairs in a matched-series fashion and received on the adjacent poles (9, 10 and 8, 10) of the armature, the pairs of coils (18, 19 and 20, 21) being connected in opposition.

* * * * *